(12) United States Patent
Uchiyama et al.

(10) Patent No.: US 11,857,949 B2
(45) Date of Patent: Jan. 2, 2024

(54) PACKING MATERIAL AND METHOD FOR PRODUCING THE SAME, AND COLUMN FOR SIZE EXCLUSION CHROMATOGRAPHY

(71) Applicant: Resonac Corporation, Tokyo (JP)

(72) Inventors: Naoki Uchiyama, Tokyo (JP); Yuzuru Kokido, Tokyo (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 18/026,978

(22) PCT Filed: Jun. 3, 2022

(86) PCT No.: PCT/JP2022/022597
§ 371 (c)(1),
(2) Date: Mar. 17, 2023

(87) PCT Pub. No.: WO2023/276549
PCT Pub. Date: Jan. 5, 2023

(65) Prior Publication Data
US 2023/0390738 A1 Dec. 7, 2023

(30) Foreign Application Priority Data

Jun. 28, 2021 (JP) ................................. 2021-106844

(51) Int. Cl.
*B01J 20/28* (2006.01)
*B01J 20/285* (2006.01)
*G01N 30/52* (2006.01)
*G01N 30/02* (2006.01)

(52) U.S. Cl.
CPC ............ *B01J 20/285* (2013.01); *G01N 30/52* (2013.01); *B01J 2220/54* (2013.01); *G01N 2030/022* (2013.01); *G01N 2030/525* (2013.01)

(58) Field of Classification Search
CPC ...... B01J 20/28; B01J 20/285; B01J 2220/54; G01N 30/52; G01N 2030/022; G01N 2030/525
USPC ......................................................... 502/402
See application file for complete search history.

(56) References Cited

U.S. PATENT DOCUMENTS

| 4,118,347 A | 10/1978 | Ishiguro et al. |
| 2010/0029914 A1 | 2/2010 | Komiya et al. |
| 2020/0054967 A1 | 2/2020 | Maruta |

FOREIGN PATENT DOCUMENTS

| CN | 105992949 A | 10/2016 |
| CN | 110267740 A | 9/2019 |
| JP | 5315691 B2 | 10/2013 |
| JP | 2018-155745 A | 10/2018 |
| WO | 2015/119255 A1 | 8/2015 |
| WO | 2018/155241 A1 | 8/2018 |

OTHER PUBLICATIONS

Ueki, Yuji et al., "Preparation and Application of Methacrylate-Based Cation-Exchange Monolithic Columns for Capillary Ion Chromatography", Analytical Chemistry, 2004, pp. 7007-7012, vol. 76, No. 23.

*Primary Examiner* — Edward M Johnson
(74) *Attorney, Agent, or Firm* — Sughrue Mion, PLLC

(57) ABSTRACT

A packing material, wherein to a porous organic polymer carrier including 60 to 95 mol % of a repeating unit derived from glycidyl methacrylate and 5 to 40 mol % of a repeating unit derived from a polyfunctional monomer, one end of at least one alkylene group selected from a linear alkylene group, a cycloalkylene group, and a linear alkylcycloalkylene group, having 4 to 9 carbon atoms is bonded by a glycidyl group derived from glycidyl methacrylate, and an other end of the alkylene group is bonded to any one end of a polyol via an ether bond.

9 Claims, No Drawings

PACKING MATERIAL AND METHOD FOR PRODUCING THE SAME, AND COLUMN FOR SIZE EXCLUSION CHROMATOGRAPHY

CROSS REFERENCE TO RELATED APPLICATIONS

This application is a National Stage of International Application No. PCT/JP2022/022597 filed on Jun. 3, 2022, claiming priority based on Japanese Patent Application No. 2021-106844 filed on Jun. 28, 2021.

TECHNICAL FIELD

The present invention relates to a packing material for size exclusion chromatography for protein purification. More particularly, the present invention relates to a packing material having high alkali resistance.

BACKGROUND ART

Size exclusion chromatography, which separates a molecule in order of size thereof, is widely used to separate a water-soluble polymer such as a polysaccharide, a peptide, a protein, DNA, or RNA. Particularly in the case of separation and fractionation of a biopolymer such as a protein, size exclusion chromatography can treat the biopolymer under a mild condition, and thus has the advantage of being able to separate and fractionate the biopolymer with a low degree of denaturation. The separated and fractionated biopolymer is used in application to a biochemical reaction and in an industrial use such as in the food, pharmaceutical, or chemical industry, and the market therefor has been remarkably expanding and growing in recent years.

In order to meet the demand, a packing material for separation and fractionation applicable to treatment of a large volume appropriate to an industrial scale is desired. In particular, in the field of a gene therapy drug, for which the market is expected to expand in the future, a further improvement in a packing material function is desired in order to greatly improve the productivity of a purification process for a viral vector, a virus-like particle, or the like. In particular, it is desired that such a packing material can be used for the precise separation and purification of a virus vector or a virus-like particle having a large molecular size, and that the precise size separation can be easily carried out through a series of steps from the culture solution to the purification.

Because of this, the packing material is desired: to have good fractionation efficiency at which a product separated and coming out can be recovered; for example, even when various components such as an impurity or an unknown component included in a biopharmaceutical derived from a fermentation product are included, to be able to suppress non-specific adsorption thereof; and further, to enable cleaning with a high-strength alkali and regeneration, which are different problems or requirements from those for the analytical column.

However, a packing material having such alkali resistance has not yet been proposed.

The present applicant has proposed a packing material for size exclusion chromatography using a methacrylate-based monomer in WO2018/155241 (Patent Literature 1). Patent Literature 1 discloses a packing material having undergone a step of polymerizing a monomer having a glycidyl group and a crosslinking agent in the presence of a polymerization initiator, hydrophilizing a porous particle made of the resulting copolymer using a sugar alcohol, and then ring-opening the residual glycidyl group using a mineral acid, but there is a demand for higher alkali resistance.

In addition, JP5315691 (Patent Literature 2) discloses a packing material obtained by hydrophilizing the surface of a crosslinked polymer particle using a monomer having a special structure among a methacrolyl monomer having improved resistance to an alkali aqueous solution. The monomer used in Patent Literature 2 is not a general-purpose monomer, and thus a problem is that the monomer is difficult to obtain easily and simply, resulting in high cost.

CITATION LIST

Patent Literature

Patent literature 1: WO2018/155241
Patent literature 2: JP5315691

SUMMARY OF INVENTION

Technical Problem

There are various reports as described above, but a packing material having high alkali resistance and suitable for fractionation is still desired.

An object of the present invention is to solve the above problem. More specifically, the object of the present invention is to provide a packing material for size exclusion chromatography having high alkali resistance and a method for producing the same.

Solution to Problem

The present inventors have carried out intensive studies in order to solve the above problem and as a result have found that a packing material having a structure in which an alkylene group is bonded to a porous particle including a crosslinked copolymer of a monomer having a glycidyl group and a crosslinking agent, and a polyol is bonded to the other end of the alkylene group has high alkali resistance, and have completed the present invention. That is, the present invention relates to the following matters.

[1] A packing material, wherein
to a porous organic polymer carrier comprising 60 to 95 mol % of a repeating unit derived from glycidyl methacrylate and 5 to 40 mol % of a repeating unit derived from a polyfunctional monomer,
one end of at least one alkylene group selected from a linear alkylene group, a cycloalkylene group, and a linear alkylcycloalkylene group, having 4 to 9 carbon atoms is bonded by a glycidyl group derived from glycidyl methacrylate, and
an other end of the alkylene group is bonded to any one end of a polyol via an ether bond.
[2] The packing material according to [1], wherein the polyfunctional monomer is a (meth)acryloyl-based monomer comprising two or more (meth)acryloyl groups.
[3] The packing material according to [1] or [2], wherein the polyfunctional monomer comprises at least one selected from ethylene glycol dimethacrylate and glycerin-1,3-dimethacrylate.
[4] The packing material according to any one of [1] to [3], wherein the alkylene group comprises either butylene or cyclohexane-1,4-dimethylene.

[5] The packing material according to any one of [1] to [4], wherein the polyol is bonded via an ether bond derived from a glycidyl group ring-opened by the polyol.
[6] The packing material according to any one of [1] to [4], wherein the polyol comprises any of ethylene glycol, polyethylene glycol, and sorbitol.
[7] The packing material according to any one of [1] to [6], wherein the packing material is for size exclusion chromatography.
[8] A method for producing the packing material according to any one of [1] to [7], the method comprising:
   a step (A) of polymerizing a raw material monomer comprising glycidyl methacrylate and a polyfunctional monomer in the presence of a diluent and a polymerization initiator to obtain a carrier α, which is a porous organic polymer carrier;
   a step (B) of reacting a glycidyl group derived from glycidyl methacrylate of the carrier α with one hydroxyl group of a diol compound comprising a linear or aliphatic ring-containing alkylene group having 4 to 9 carbon atoms in a structure thereof to obtain a carrier β to which an end of the diol compound comprising the alkylene group in the structure thereof is bonded;
   a step (C) of reacting an other hydroxyl group of the diol compound comprising the alkylene group in the structure thereof bonded to the carrier β with epichlorohydrin to obtain a carrier γ in which a glycidyl group is introduced into the carrier β; and
   a step (D) of reacting the glycidyl group of the carrier γ with a hydroxyl group of a polyol in the presence of water to obtain a carrier δ to which any one end of the polyol is bonded as an ether bond.
[9] A column for size exclusion chromatography, comprising a housing for liquid chromatography and the packing material according to any one of [1] to [7] packed into the housing for liquid chromatography.

Advantageous Effects of Invention

According to the present invention, a packing material having high alkali resistance and suitable for fractionation can be obtained. This can enhance the speed of the separation treatment. Further, the packing material can be produced from an inexpensive raw material by a simple step and can be easily applied to an industrial scale in which a large amount of a packing material is used.

DESCRIPTION OF EMBODIMENT

Hereinafter, an embodiment of the present invention will be described in detail, but a material, a dimension, and the like given as examples in the following description are just examples, the present invention is not limited thereto, and the embodiment can be appropriately modified as long as the gist thereof is not changed, to be practiced.

The packing material encompasses one that can be used alone as a packing material, and one that can be used by modifying the surface depending on the purpose.

In addition, as used herein, "(meth)acryl" means acryl and methacryl, and the same also applies to "(meth)acryloyl."
[Packing Material]

The packing material of the present embodiment has a structure in which a specific skeleton is bonded to a porous organic polymer carrier as shown below.
(Porous Organic Polymer Carrier)

The porous organic polymer carrier (hereinafter, abbreviated as the carrier α) contains 60 to 95 mol % of a repeating unit derived from glycidyl methacrylate and 5 to 40 mol % of a repeating unit derived from a polyfunctional monomer. The porous organic polymer carrier contains preferably a repeating unit derived from glycidyl methacrylate at a ratio of 65 to 95 mol % and a repeating unit derived from a polyfunctional monomer at a ratio of 5 to 35 mol %, and further preferably a repeating unit derived from glycidyl methacrylate at a ratio of 75 to 92 mol % and a repeating unit derived from a polyfunctional monomer at a ratio of 8 to 25 mol %. When the ratio of the repeat unit derived from a polyfunctional monomer is low, the final packing material may provide a high back pressure and be unsuitable for use, and when the ratio of the repeat unit derived from a polyfunctional monomer is high, non-specific adsorption may occur to make the intended fractionation impossible. The carrier α of the present embodiment can also be obtained by using glycidyl acrylate.

The polyfunctional monomer is a compound having two or more ethylenic double bonds in the molecule thereof. The polyfunctional monomer is preferably one having two or more (meth)acryloyl groups in the molecule thereof. Specific examples thereof include alkanediol di(meth)acrylate wherein the alkane has 1 to 12 carbon atoms, trimethylolpropane tri(meth)acrylate, ditrimethylolpropane tetra(meth)acrylate, pentaerythritol tetra(meth)acrylate, pentaerythritol penta(meth)acrylate, dipentaerythritol penta(meth)acrylate, and dipentaerythritol hexa(meth)acrylate, and also include polyfunctional urethane (meth)acrylate. These compounds may be used singly or in combinations of two or more.

Preferably, at least one selected from ethylene glycol dimethacrylate and glycerin-1,3-dimethacrylate is included. Ethylene glycol dimethacrylate and/or glycerin-1,3-dimethacrylate may account for 50 mol % or more, based on the total amount of the polyfunctional monomer, accounts for preferably 80 mol % or more, and from the viewpoint of pore formation or the like, ethylene glycol dimethacrylate and/or glycerin-1,3-dimethacrylate further preferably accounts for the total amount.

The copolymer may include a further monomer unit in a range that does not greatly change a property of the porous particle as long as the copolymer includes 95 mol % or more in total of the glycidyl methacrylate and the polyfunctional monomer as monomer units. Examples of a monomer having a glycidyl group that can be used as a further monomer include 3,4-epoxycyclohexylmethyl methacrylate, 4-hydroxybutyl acrylate glycidyl ether, as well as methyl (meth)acrylate and ethyl (meth)acrylate.

The degree of crosslinking of the copolymer is 5 mol % to 40 mol %, preferably 5 mol % to 35 mol %, and more preferably 8 to 25 mol %.

The degree of crosslinking is represented by (Total number of moles of polyfunctional monomer/
total number of moles of all monomers)×
100=degree of crosslinking(mol %).

When the degree of crosslinking is low, the final packing material may be unsuitable for use because of the high back pressure of a column for size exclusion chromatography, and when the degree of crosslinking is high, non-specific adsorption may occur to make the intended fractionation impossible.
(Surface Structure)

In the present embodiment, one end of at least one alkylene group selected from a linear alkylene group, a cycloalkylene group, a linear alkylcycloalkylene group, and a cycloalkyldialkylene group, having 4 to 9 carbon atoms, is bonded to the carrier α. The one end of the alkylene group is bonded to the carrier α via an ether bond formed by a ring-opening reaction of a glycidyl group derived from glycidyl methacrylate included in the carrier α. In addition, the other end of the alkylene group is bonded to a polyol directly or indirectly via an ether bond. The ether bond encompasses both one derived from a polyol and one derived from an epoxy compound used when introducing a polyol such as epichlorohydrin. That is, the structure thereof is a structure having a hydrophobic skeleton forming a hydrophobic layer derived from an alkylene group on the surface of the carrier and further, a hydrophilic skeleton forming a hydrophilic layer derived from a polyol on the surface of the hydrophobic layer. Such a structure is preferably introduced at a density of 500 μmol/g to 2000 μmol/g, and preferably 700 μmol/g to 1800 μmol/g, based on the dry mass of the carrier. The introduction density can be measured from the amount of the glycidyl group, the amount of the polyol, further, the amount of a glycidyl group introduced midway in the production method described later, or the like, and the introduction density can also be adjusted by adjusting these.

The alkylene group is a divalent group formed by removing one hydrogen at each of the hydrocarbons at both ends of the longest molecular chain or, in the case of cycloalkyl, the hydrocarbons at the farthest position in the cyclic structure from alkyl such as linear alkyl or cycloalkyl, or linear alkylcycloalkyl (alkylcycloalkyl, cyclodialkyl), having 4 to 9 carbon atoms. In addition, the straight chain or the aliphatic ring may have an alkyl group as a side chain.

Specific examples of the alkylene group include butylene, hexylene, heptylene, 1,4-cyclohexylene, 1-methylene-4-cyclohexyl, and cyclohexane-1,4-dimethylene. When the number of carbon atoms is small, the alkali resistance may be insufficient, and when the number of carbon atoms is too large, non-specific adsorption may occur and the intended fractionation may be impossible. The alkylene group preferably includes at least one selected from a butylene group and a cyclohexane-1,4-dimethylene group because the alkali resistance suppression of non-specific adsorption, etc., are excellent in a well-balanced manner, and the intended fractionation efficiency is good.

The polyol is preferably one that contains two or more hydroxyl groups, is stable to an alkali, and has sufficient hydrophilicity, and examples thereof include polyether polyol and polylactone polyol. The polyol is bonded to the alkylene group constituting the hydrophobic skeleton directly or indirectly via an ether bond. At least one hydroxyl group remains in the polyol bonded to the alkylene group. When a diol compound is used as a raw material for introducing an alkylene group constituting a hydrophobic skeleton, two hydroxyl groups of the diol compound are both changed into ether-bonded oxygen by reaction, providing distinguishment from a constitutional portion derived from the polyol in which at least one hydroxyl group remains.

Specific examples of the polyol include various known saturated and unsaturated low molecular weight glycols such as ethylene glycol, diethylene glycol, or triethylene glycol, polyethylene polyol, and a polyalkylene glycol such as polyethylene glycol. Further examples thereof that can be used also include a sugar alcohol such as a tritol such as glycerin; a tetritol such as erythritol or threitol; a pentitol such as arabinitol or xylitol; a hexitol such as sorbitol or mannitol; or a heptitol such as volemitol or perseitol. The structure bonded via an ether bond from the polyol is distinguished from the above alkylene group having 4 to 9 carbon atoms in terms of the chain length, the structure having a hydroxyl group, or the like The average molecular weight of the polyol is not particularly limited as long as the average molecular weight is 5000 or less. When the average molecular weight of the polyol is 5000 or more, the inside of a pore of the carrier α may be clogged to make the intended fractionation impossible.

The polyol used in the present invention is desirably a polyol having an octanol-water partition coefficient (log P) of −1.2 or less. The octanol-water partition coefficient (log P) is, for example, ethylene glycol (−1.36), triethylene glycol (−1.98), polyethylene glycol (lower than −1.98), sorbitol (−2.20), glycerin (−1.76), isopropylene glycol (−1.07), and 1,4-butanediol (−0.88).

In addition, a polyol that does not have a structure inducing hydrolysis by an alkali, such as an ester, a thioester, a carbonate, a thiocarbonate, a carbamate, a thiocarbamate, or a siloxane is desirable in that it is stable to an alkali.

The weight average molecular weight of the polyol is not particularly limited, and may be 50 or more from the viewpoint of hydrophilicity, and may be 200 or less from the viewpoint of ease of introduction or the like.

Among the polyols described above, ethylene glycol, polyethylene glycol, erythritol, sorbitol, and volemitol, which are easy to introduce, are preferable, and ethylene glycol, polyethylene glycol, and sorbitol, which are available at low cost, are more preferable.

The polyol may be bonded to the alkylene group via an ether bond, and can be directly bonded, and may be bonded to the alkylene group indirectly via a structure by epichlorohydrin used when introducing a glycidyl group as described later.

When polyethylene glycol is used as an example of the polyol, the packing material of the present invention is schematically represented by the following chemical formula, but the present invention is not particularly limited to this example.

[Chem. 1]

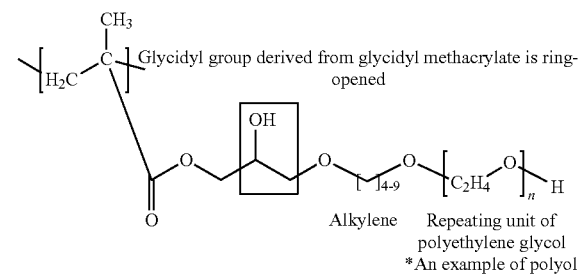

Method for Producing Packing Material

The packing material of the present embodiment can be produced by the following steps (A) to (D).

The method for producing the packing material includes:
a step (A) of polymerizing a raw material monomer including glycidyl methacrylate and a polyfunctional monomer in the presence of a diluent and a polymerization initiator to obtain a carrier α, which is a porous organic polymer carrier,
a step (B) of reacting a glycidyl group derived from glycidyl methacrylate of the carrier α with one hydroxyl group of a diol compound including a linear or aliphatic ring-containing alkylene group having 4 to 9 carbon atoms in a structure thereof to obtain a carrier β to which an end of the diol compound including the alkylene group in the structure thereof is bonded;

a step (C) of reacting an other hydroxyl group of the diol compound including the alkylene group in the structure thereof bonded to the carrier β with epichlorohydrin to obtain a carrier γ in which a glycidyl group is introduced into the carrier β; and a step (D) of reacting the glycidyl group of the carrier γ with a hydroxyl group of a polyol in the presence of water to obtain a carrier δ to which one end of the polyol is bonded as an ether bond.

[Step (A)]

A carrier α is prepared from a copolymer having glycidyl methacrylate and polyfunctional monomer as monomer units.

The carrier α is obtained by copolymerizing these monomers in the presence of a diluent and a polymerization initiator.

These can be produced with reference to the method described in JP2007-170907, WO2006/132333, or the like.

Desirably, the glycidyl methacrylate concentration of the raw material monomer is 60 to 95 mol %, and preferably 70 to 95 mol %. Desirably, the polyfunctional monomer concentration of the raw material monomer is 5 mol % to 40 mol %, and preferably 5 mol % to 30 mol %.

In addition, as described above, a further monomer component may be included.

In order to introduce a pore into the carrier α, a diluent is added to the monomer mixture, which is then polymerized. The diluent is an organic solvent having the property of being soluble in the monomer mixture, being inert to polymerization, and further, not dissolving the copolymer produced. By removing the diluent by cleaning or the like after completion of polymerization, a portion occupied by the diluent is made hollow to form a porous pore in a particle of the carrier α.

Examples of the diluent that can be used include an aromatic hydrocarbon such as toluene, xylene, diethylbenzene, dodecylbenzene, or chlorobenzene; a saturated hydrocarbon such as hexane, heptane, pentane, octane, nonane, or decane; an alcohol such as isoamyl alcohol, hexyl alcohol, heptyl alcohol, octyl alcohol, or nonyl alcohol; an aliphatic halogenated hydrocarbon such as dichloromethane, dichloroethane, or trichloroethane; and an aliphatic or aromatic ester such as ethyl acetate, propyl acetate, butyl acetate, pentyl acetate, diethyl succinate, methyl benzoate, ethyl benzoate, or propyl benzoate. These diluents can be used singly or as a mixture of two or more.

The amount of the diluent added affects the exclusion limit molecular weight and the percentage by volume of the pore volume (representing the proportion of the pore volume to the total volume of the packing material particles) of the packing material. Because of this, the diluent is added by appropriately regulating the amount thereof. The amount of these diluents added is used at a volume of 0.8 to 4.0 times, preferably 1.0 to 3.0 times, the total volume of the raw material monomers at the temperature at the time of supply.

The polymerization initiator used during polymerization is not particularly limited as long as it is a known radical polymerization initiator that generates a radical. Examples thereof include an azo-based initiator such as 2,2'-azobisisobutyronitrile, 2,2'-azobis(methyl isobutyrate), and 2,2'-azobis(2,4-dimethylvaleronitrile). Among these, 2,2'-azobis(2,4-dimethylvaleronitrile) is desirably used from the viewpoint of the affinity of the chemical structure. The concentration of the polymerization initiator is not particularly limited, and is preferably 0.1 to 5 parts by mass per 100 parts by mass in total of the monomers.

An oil phase containing the monomers is prepared using the monomer mixture, the diluent, and the polymerization initiator. The oil phase is formed into oil droplets by stirring and suspending the oil phase in an aqueous medium containing an appropriate dispersion stabilizer. Polymerization in this state (suspension polymerization) generates a copolymer in the form of porous particles having appropriate particle diameters. Besides the method by stirring as described above, a method in which a monomer solvent containing the diluent is added dropwise to the aqueous medium through a porous membrane or a microchannel formed on a quartz substrate can be applied to the production method of oil droplets.

Known stabilizers can be used as the dispersion stabilizer contained in the aqueous medium. A water-soluble polymer compound such as gelatin, sodium polyacrylate, or polyvinyl alcohol is usually used. Polyvinyl alcohol is generally used. The concentration of the dispersion stabilizer is preferably 0.1 to 5 mass % based on the aqueous medium.

The aqueous medium may include a water-soluble component such as a salt in addition to water. Examples of the salt include a generally used salt such as sodium chloride or calcium chloride. The solubility differs among salts used and thus the concentration of a salt used cannot be unconditionally specified, and for example, it is also possible to use sodium chloride by dissolving the same at 0.1 to 15 mass % and calcium chloride by dissolving the same at 1 to 40 mass %. The salt is added for salting out.

Usually, the suspension polymerization reaction is carried out by purging with nitrogen gas, then heating to 40 to 100° C. under stirring, and under atmospheric pressure for 5 to 16 hours. At this time, the monomers included in each oil droplet are polymerized with the diluent included therein, and a polymer grows in the form of a network, and thus the diluent can subsequently be removed to obtain a porous particle. After the reaction, the porous particle can be easily separated from the aqueous medium by filtration or the like. Further, the porous particle is cleaned with a solvent such as acetone or methanol to remove the diluent. The porous particle is dried, then the resulting porous particle having a glycidyl group is classified using a sieve or an air classifier.

The carrier α thus obtained in the step (A) is a porous particle having a glycidyl group derived from glycidyl methacrylate, and has the above average particle diameter and pore.

[Step (B)]

Next, the glycidyl group derived from glycidyl methacrylate of the carrier α is reacted with a diol compound including a linear or aliphatic ring-containing alkylene group having 4 to 9 carbon atoms in the structure thereof to obtain a carrier β made of a porous organic polymer. The glycidyl group present on the surface of the porous particle is ring-opened and reacts with a terminal hydroxyl group of the diol compound to bond the diol compound to the porous particle via an ether bond derived from the terminal hydroxyl group. An alkylene moiety of this diol compound ultimately constitutes a hydrophobic portion of the packing material.

Specifically, the diol compound and the carrier α are reacted with each other in the presence of a solution including a catalyst. Examples of the diol compound include 1,4-butanediol, 1,5-pentanediol, 1,6-hexanediol, 1,7-heptanediol, 1,4-cyclohexanediol, 4-(hydroxymethyl)cyclohexanol, and 1,4-cyclohexanedimethanol. When the number of carbon atoms is in the above range, the alkali resistance is high and the hydrophobicity is not too strong, and thus the induction of non-specific adsorption can be suppressed.

The amount of the diol compound used is preferably 100 parts by mass to 2000 parts by mass per 100 parts by mass of the carrier α.

In addition, the amount of the diol compound used is preferably 100 mol % to 2000 mol % based on glycidyl methacrylate included in the carrier α.

If the amount of the diol compound used is in the above range, the packing material can be obtained because the alkali resistance and suppression of non-specific adsorption are excellent in a well-balanced manner and the intended fractionation efficiency is good.

It is preferable to adjust the amount of the diol compound used and the reaction conditions such that 80 mol % or more, preferably 90 mol % or more, of glycidyl methacrylate included in the carrier α reacts with the diol compound.

Examples of the catalyst that can be used include a boron trifluoride diethyl ether complex, zinc borofluoride, trimethylsilyltrifluoromethanesulfonic acid, sulfuric acid, trifluoromethanesulfonic acid, trifluoroacetic acid, and dichloroacetic acid. The amount of the catalyst is preferably 0.1 parts by mass to 100 parts by mass, and more preferably 0.5 parts by mass to 20 parts by mass, per 100 parts by mass of the carrier α. Within this range, the diol compound can be introduced, and the reaction of an ester group or the like of the porous particle can be prevented.

By cleaning the obtained carrier β with dimethylsulfoxide or the like, the excess diol compound, catalyst, and the like are removed.

[Step (C)]

Next, a glycidyl group is introduced into the carrier s using epichlorohydrin to obtain a carrier γ. That is, the hydrogen atom of one unreacted hydroxyl group of the diol compound introduced into the carrier β causes an elimination reaction with the chlorine atom of epichlorohydrin, and a glycidyl group is introduced into the carrier β via —OCH$_2$CH(OH)CH$_2$— derived from the structure of epichlorohydrin.

In addition to epichlorohydrin, any glycidyl group-containing compound can be used, and specific examples thereof include 1,4-butanediol diglycidyl ether, ethylene glycol diglycidyl ether, and glycerin diglycidyl ether. Among these, epichlorohydrin is preferably used because it is easy to introduce.

Introduction of a glycidyl group-containing compound such as epichlorohydrin is carried out by a reaction resulting from adding 100 to 300 parts by mass of the glycidyl group-containing compound based on the mass of the carrier β together with the carrier β in the presence of a catalyst in the absence of a solvent or in a solvent such as dimethylsulfoxide and stirring these uniformly. This introduces a glycidyl group into the end of the diol compound bonded to the carrier β that is not bonded to the carrier β.

The amount of a glycidyl group-containing compound such as epichlorohydrin may be excessive based on the amount of one unreacted hydroxyl group of the diol compound introduced into the carrier β, and assuming that 100% of the alkylene group has been introduced into the glycidyl group derived from glycidyl methacrylate, the amount of the glycidyl group-containing compound is preferably in the range of 100 mol % to 1000 mol % based on the terminal hydroxyl group (mol) of the alkylene group.

An alkali metal hydroxide is used as the catalyst, and examples thereof include an alkali metal hydroxide such as sodium hydroxide or potassium hydroxide. The amount thereof is preferably 1 part by mass to 100 parts by mass, and further, more preferably 5 parts by mass to 50 parts by mass, per 100 parts by mass of the carrier β.

[Step (D)]

A carrier γ in which a glycidyl group has been introduced is reacted with a polyol in the presence of water to immobilize any one end of the polyol to obtain a carrier δ. At this time, if necessary, a catalyst may be used, and the above alkali metal hydroxide can be used.

Any one terminal hydroxyl group of a polyol compound reacts with a glycidyl group, and the terminal of the polyol compound is introduced onto the surface of the carrier γ via an ether structure. The polyol compound has a plurality of hydroxyl groups, and thus at least one hydroxyl group remains. Also in the step (D), the reaction can be carried out by adding an alkali metal hydroxide to the carrier γ and the polyol compound that are caused to be coexistent with each other in the solvent and heating and stirring these. The amount of water may be 1 to 3 times the dry mass of the carrier γ.

The amount of the polyol compound used is preferably 10 parts by mass to 1500 parts by mass per 100 parts by mass of the carrier γ. When the amount of the polyol compound is small, the amount introduced tends to be small, resulting in insufficient hydrophilicity, and when the amount thereof is too large, an increased amount of the solvent may be required for dissolution.

The amount of the polyol compound used is preferably in the range of 100 mol % to 20,000 mol % based on the glycidyl group (mol) introduced into the carrier γ. When the amount of the polyol compound is small, the amount introduced tends to be small, resulting in insufficient hydrophilicity, and when the amount thereof is too large, an increased amount of the solvent may be required for dissolution.

By washing the obtained carrier δ, that is, the packing material of the present embodiment, with water, the excess polyol alcohol and alkali metal hydroxide are removed.

In addition, an unreacted glycidyl group may remain in the obtained packing material. When a glycidyl group remains, the hydrophobicity of the packing material increases, and there is concern that a highly hydrophobic water-soluble compound such as a protein is hydrophobically adsorbed. Because of this, in order to enhance the hydrophilicity, the remaining glycidyl group is desirably ring-opened using a mineral acid.

Examples of the mineral acid include sulfuric acid, nitric acid, and hydrochloric acid. Among these, sulfuric acid is particularly preferable. The concentration of the mineral acid used may be about 0.01 M to 1.0 M, and is particularly preferably about 0.1 to 0.5 M. If the concentration of the mineral acid is 0.01 M or more, the ring-opening is sufficiently carried out, and if the concentration of the mineral acid is 1.0 M or less, an ester group or the like in the carrier is not hydrolyzed to form an ionic functional group. By washing the resulting particle with water, the excess mineral acid is easily removed.

Properties of Packing Material

The average particle diameter of the packing material is not particularly limited as long as it is 10 µm or more, and is preferably in the range of 15 to 100 µm from the viewpoint of the column packing property or the like. Here, the average particle diameter is represented by the volume-average particle diameter. The volume-average particle diameter is a value obtained using an image analysis-based particle size distribution measuring apparatus. When an image analysis-based particle size distribution measuring apparatus is used to measure the volume-average particle diameter of a particle, the volume-average particle diameter is a particle diameter obtained by imaging 2000 or more crosslinked polymer particles using the image analysis-based particle size distribution measuring apparatus to obtain two-dimensional particle images (preferably still images), obtaining the equivalent circle diameter (diameter of a circle having an area equal to the projected area of a particle) of each particle from the two-dimensional particle images, calculating the volume of the particle from the equivalent circle diameter, and averaging the diameters based on the volume. At this time, each particle is regarded as a sphere having the same diameter as the above equivalent circle diameter. Examples of the image analysis-based particle size distribution measuring apparatus that can be used include a flow particle image analyzer (trade name: FPIA-3000, manufactured by Sysmex Corporation). The average particle diameter of the packing material can be adjusted by adjusting the polymerization conditions during the production of the carrier.

The packing material has a pore. The size of the pore is appropriately selected depending on the purpose.

The packing material of the present embodiment has suitable hydrophilicity and exclusion limit molecular weight. The hydrophilicity and the exclusion limit molecular weight can be adjusted by the type and amount of the diluent or the ratios of glycidyl methacrylate and the polyfunctional monomer. The average particle diameter and the pore diameter of the packing material is not changed by the surface structure.

The exclusion limit molecular weight suitable for protein purification is 1,000,000 to 100,000,000, and more preferably 50,000,000 to 20,000,000. Within this range, a protein can be efficiently separated.

The exclusion limit molecular weight can be determined by a generally known method by connecting a column packed with the packing material to a high-performance liquid chromatograph, allowing ion exchanged water as the mobile phase to flow at a flow rate of 1.0 mL per minute, injecting a reference material having various molecular weights into the column, and using the elution volume thereof. In the present embodiment, a differential refractive index detector (trade name: RI-201H, manufactured by Showa Denko K.K.) is used, and a pullulan standard (trade name: Shodex (registered trademark) STANDARD P-82, manufactured by Showa Denko K.K.) is used as the reference material.

In order to separate a large protein by size exclusion chromatography, the exclusion limit molecular weight is appropriately selected according to the molecular weight of the protein. For example, when a large protein such as IgM having a molecular weight of about 900,000 or IgG having a molecular weight of about 150,000 is separated, if the exclusion limit is less than 1,000,000, the molecular weight of IgM falls outside the exclusion limit and IgM cannot be separated.

Because of this, by packing the packing material into a housing for liquid chromatography, a high-performance column for size exclusion chromatography can be obtained, and further, a chromatography apparatus including the column for size exclusion chromatography can be obtained. In addition, by using this column for size exclusion chromatography, a method for separating and a method for fractionating a biopolymer that can precisely separate and further fractionate the biopolymer, respectively, using an aqueous eluent can be provided.

In addition, the packing material has high alkali resistance, and thus can be cleaned and reused, and can be used continuously for a long period of time.

EXAMPLES

Hereinafter, the advantageous effects of the present invention will be made clearer with reference to Examples. The present invention is not limited to the following Examples and can be appropriately modified as long as the gist thereof is not changed, to be practiced.

Example 1

<Step (A): Synthesis of porous particle having glycidyl group>

27.8 g of glycidyl methacrylate (trade name: Blemmer G (registered trademark) manufactured by NOF Corporation), 11.3 g of glycerin-1,3-dimethacrylate (trade name: NK Ester 701, SHIN-NAKAMURA CHEMICAL Co., Ltd.), and 1.9 g of 2,2'-azobis(2,4-dimethylvaleronitrile) were dissolved in 58.7 g of diethyl succinate as a diluent, and nitrogen gas was bubbled for 30 minutes to provide an oil phase.

Next, separately from the oil phase, 10.0 g of PVA-224 (manufactured by Kuraray Co., Ltd., polyvinyl alcohol having a degree of saponification of 87.0% to 89.0%) as a dispersion stabilizer and 10.0 g of sodium chloride as a salting-out agent were dissolved in 480 g of ion exchanged water to provide an aqueous phase.

The aqueous phase and the oil phase were placed in a separable flask and dispersed at a rotation speed of 430 rpm for 20 minutes using a stirring rod equipped with a half-moon stirring blade, then the inside of the reactor was purged with nitrogen, and the reaction was carried out at 60° C. for 16 hours.

After that, the resulting polymer was transferred onto a glass filter and thoroughly washed with hot water at about 50 to 80° C., denatured alcohol, and water in the order presented to obtain 100.4 g of a porous particle (carrier a1).

The amount of glycidyl methacrylate used was 79.8 mol % based on the total amount of the monomers, and the amount of glycerin-1,3-dimethacrylate used was 20.2 mol % based on the total amount of the monomers.

<Step (B): Introduction reaction of alkylene group>

98 g of the carrier α1 was weighed onto a glass filter and thoroughly cleaned with diethylene glycol dimethyl ether. After cleaning, the carrier α1 was placed in a 1 L separable flask, 150 g of diethylene glycol dimethyl ether and 150 g (920 mol % based on glycidyl methacrylate) of 1,4-butanediol were placed in the separable flask, and stirring and dispersion were carried out.

After that, 1.5 ml of a boron trifluoride diethyl ether complex was added, the temperature was raised to 80° C. while stirring at 200 rpm, and the resulting mixture was subjected to the reaction for 4 hours.

The mixture was cooled, then the porous particle (carrier β1) bonded to a diol compound including an alkylene group in the structure thereof was collected by filtration and then washed with 1 L of ion exchanged water to obtain 152 g of a carrier β1.

The progress of the reaction was confirmed by the following procedure.

A part of the dry porous particle into which an alkylene group had been introduced was mixed with potassium bromide, and the resulting mixture was pelletized by applying a pressure and then measured using FT-IR (trade name: Nicolet (registered trademark) iS10, manufactured by Thermo Fisher Scientific Inc.) to check the height of an absorbance peak at 908 cm$^{-1}$ due to the glycidyl group in the infrared absorption spectrum.

As a result, no absorbance peak at 908 cm$^{-1}$ was observed by FT-IR.

<Step (C): Introduction Reaction of Glycidyl Group>

150 g of the carrier β1 was weighed onto a glass filter and thoroughly cleaned with dimethylsulfoxide.

After cleaning, the carrier β1 was placed in a separable flask, 262.5 g of dimethyl sulfoxide and 150 g of epichlorohydrin were added, the resulting mixture was stirred at room temperature, 37.5 ml of a 30% sodium hydroxide aqueous solution (manufactured by KANTO CHEMICAL CO., INC.) was further added, and the resulting mixture was heated to 30° C. and stirred for 6 hours.

After completion of the reaction, the obtained product was transferred onto a glass filter and thoroughly washed with water, acetone, and water in the order presented to obtain 172 g of a porous particle into which a glycidyl group had been introduced (carrier γ1).

The introduction density of the glycidyl group in the obtained carrier γ1 was measured by the following procedure.

5.0 g of the carrier γ1 was sampled, and the dry mass thereof was measured and as a result, found to be 1.47 g. Next, the same amount of the carrier γ1 was weighed into a separable flask and dispersed in 40 g of water, 16 mL of diethylamine was added while stirring at room temperature, and the resulting mixture was heated to 50° C. and stirred for 4 hours. After completion of the reaction, the reaction product was transferred onto a glass filter and thoroughly washed with water to obtain a porous particle A into which diethylamine had been introduced.

The obtained porous particle A was transferred into a beaker and dispersed in 150 mL of a 0.5 mol/L potassium chloride aqueous solution, and titration was carried out using 0.1 mol/L hydrochloric acid with the point at which the pH reached 4.0 as the neutralization point.

From this, the amount of diethylamine introduced into the porous particle A into which diethylamine had been introduced was calculated, and the density of the glycidyl group of the carrier γ1 was calculated from the following expression.

As a result, the density of the glycidyl group was 880 μmol/g.

Density(μmol/g) of glycidyl group={0.1×volume(μL) of hydrochloric acid at neutralization point/dry mass(g) of porous particle into which glycidyl group has been introduced}

<Step (D): Introduction Reaction of Polyol>

150 g of the carrier γ1, 600 mL of water, and 1000 g (13000 mol % based on glycidyl group) of D-sorbitol (log P=−2.20, manufactured by KANTO CHEMICAL CO., INC.) were placed in a 3 L separable flask and stirred to form a dispersion.

After that, 10 g of potassium hydroxide was added, the temperature was raised to 60° C. while stirring at 200 rpm, and the resulting mixture was subjected to the reaction for 15 hours.

The mixture was cooled, and then the reaction product was collected by filtration and washed thoroughly with water to obtain 152 g of a porous particle into which polyol had been introduced (carrier 61).

The obtained carrier 61 was classified into 16 to 37 μm using a sieve to obtain 140.5 g of a packing material 1.

<Evaluation of Alkali Resistance>

The alkali resistance was evaluated by calculating the amount of a carboxy group produced by hydrolysis of sodium hydroxide according to the following procedure.

First, 4 g of the packing material was dispersed in 150 mL of a 0.5 mol/L potassium chloride aqueous solution, and titration was carried out using 0.1 mol/L sodium hydroxide aqueous solution with the point at which the pH reached 7.0 as the neutralization point. From this, the amount of a carboxy group before hydrolysis included in the packing material was calculated from the following expression.

Amount(μmol/mL) of carboxy group=0.1×volume (μL) of sodium hydroxide aqueous solution at the time of neutralization/apparent volume (mL) of packing material Here, the apparent volume of the packing material is the volume of the packing material phase measured after preparing a slurry liquid by dispersing 4 g of the packing material in water, transferring the slurry liquid to a graduated cylinder, and then allowing the same to stand for a sufficient time.

Subsequently, 4 g of the packing material was weighed into a separable flask, 20 mL of a 5 mol/L sodium hydroxide aqueous solution was added, and the resulting mixture was treated at 50° C. for 20 hours while stirring at 200 rpm. The mixture was cooled, then the packing material was collected by filtration, then washed with a 0.1 mol/L HCl aqueous solution and water in the order presented, and the amount of a carboxy group contained in the obtained packing material was calculated by the same method as above. From the difference between the amount of a carboxy group before and that after the reaction with the 5 mol/L sodium hydroxide aqueous solution, the amount of a carboxy group produced by the reaction with the 5 mol/L sodium hydroxide aqueous solution was calculated. As a result, the amount of a carboxy group produced was 21 μmol/mL.

If the amount of a carboxy group produced is 40 μmol/mL or less, the alkali resistance is considered to be high.

<Evaluation of Non-Specific Adsorption>

The obtained packing material was packed into a stainless steel column (manufactured by Sugiyama Shoji Co., Ltd.) having an inner diameter of 8 mm and a length of 300 mm by a balanced slurry method. Using the obtained column, a non-specific adsorption test was carried out by the method shown below.

The column packed with the packing material was connected to a Shimadzu Corporation HPLC system (liquid feed pump (trade name: LC-10AT, manufactured by Shimadzu Corporation), autosampler (trade name: SIL-10AF, manufactured by Shimadzu Corporation), and photodiode array detector (trade name: SPD-M10A, manufactured by Shimadzu Corporation)), and a 50 mmol/L sodium phosphate buffer aqueous solution as a mobile phase was passed at a flow rate of 0.6 mL/min.

Using the same sodium phosphate aqueous solution as the mobile phase as a solvent, their respective sample solutions of 0.7 mg/mL thyroglobulin (Mw of 6.7×105), 0.6 mg/mL γ-globulin (Mw of 1.6×105), 0.96 mg/mL BSA (Mw of 6.65×104), 0.7 mg/mL ribonuclease (Mw of 1.3×104), 0.4 mg/mL aprotinin (Mw of 6.5×103), and 0.02 mg/mL uridine (Mw of 244) (all manufactured by Merck Sigma-Aldrich) are prepared, and 10 μL of each is injected from the autosampler.

The elution time of each observed using the photodiode array detector at a wavelength of 280 nm was compared to confirm that there was no contradiction between the order of elution volume and the order of molecular weight size.

As a result, the elution volumes of the samples from the column packed with the packing material 1 were 8.713 mL, 9.691 mL, 9.743 mL, 10.396 mL, 11.053 mL, and 11.645 mL, and it was confirmed that there was no contradiction between the order of the molecular weights of the samples and the order of the elution volumes thereof and that no non-specific adsorption was induced. When there was no contradiction between the order of the molecular weights of the samples and the order of the elution volumes thereof, there was no non-specific adsorption, which is indicated as 0 in Table 1, and when there was a contradiction therebetween, non-specific adsorption was induced, which is thus indicated as X.

Example 2

A porous particle (carrier α1) was obtained in the same manner as in Example 1, and then a packing material 2 was obtained as follows.

98 g of the carrier α1 was weighed onto a glass filter and thoroughly cleaned with diethylene glycol dimethyl ether.

After cleaning, the porous particle was placed in a 1 L separable flask, 150 g of diethylene glycol dimethyl ether and 150 g (580 mol % based on the glycidyl group) of 1,4-cyclohexanedimethanol were placed in the separable flask, and stirring and dispersion were carried out.

After that, 1.5 ml of a boron trifluoride diethyl ether complex was added, the temperature was raised to 80° C. while stirring at 200 rpm, and the resulting mixture was subjected to the reaction for 4 hours.

The mixture was cooled, then the resulting porous particle (carrier $2) bonded to a diol compound including an alkylene group in the structure thereof was collected by filtration and then washed with 1 L of ion exchanged water to obtain 165 g of a carrier 32.

The progress of the reaction was confirmed by the following procedure.

A part of the dry porous particle into which an alkylene group had been introduced was mixed with potassium bromide, and the resulting mixture was pelletized by applying a pressure and then measured using FT-IR (trade name: Nicolet (registered trademark) iS10, manufactured by Thermo Fisher Scientific Inc.) to check the height of a absorbance peak at 908 cm$^{-1}$ due to the glycidyl group in the infrared absorption spectrum.

As a result, no absorbance peak at 908 cm$^{-1}$ was observed by FT-IR.

<Step (C): Introduction Reaction of Glycidyl Group>

150 g of the carrier $2 was weighed onto a glass filter and thoroughly cleaned with dimethylsulfoxide. After cleaning, the carrier $2 was placed in a separable flask, 262.5 g of dimethyl sulfoxide and 150 g of epichlorohydrin were added, the resulting mixture was stirred at room temperature, 37.5 ml of a 30% sodium hydroxide aqueous solution (manufactured by KANTO CHEMICAL CO., INC.) was further added, and the resulting mixture was heated to 30° C. and stirred for 6 hours. After completion of the reaction, the porous particle was transferred onto a glass filter and thoroughly washed with water, acetone, and water in the order presented to obtain 180 g of a porous particle into which a glycidyl group had been introduced (carrier γ2).

The introduction density of the glycidyl group in the obtained carrier γ2 was measured in the same manner as in Example 1. As a result, the density of the glycidyl group was 900 μmol/g.

<Step (D): Introduction Reaction of Polyol>

150 g of the carrier γ2 was weighed onto a glass filter and thoroughly cleaned with diethylene glycol dimethyl ether. After cleaning, the carrier γ2 was placed in a 1 L separable flask, 150 g of diethylene glycol dimethyl ether and 150 g (5760 mol % based on the glycidyl group) of ethylene glycol (log P=−1.36) were placed in the separable flask, and stirring and dispersion were carried out. After that, 1.5 mL of a boron trifluoride diethyl ether complex was added, the temperature was raised to 80° C. while stirring at 200 rpm, and the resulting mixture was subjected to the reaction for 4 hours. The mixture was cooled, and then the reaction product was collected by filtration and washed thoroughly with water to obtain 152 g of a polyol-introduced porous particle (carrier δ2). The carrier δ2 was classified into 16 to 37 μm using a sieve to obtain 140.5 g of a packing material 2.

The alkali resistance of the obtained packing material 2 was evaluated in the same manner as in Example 1. As a result, the amount of a carboxy group produced was 15.2 μmol/mL, and it was confirmed that the packing material 2 had excellent alkali resistance.

Further, the non-specific adsorption of the obtained packing material 2 was evaluated in the same manner as in Example 1. As a result, the elution volumes of the samples were 8.814 mL, 9.635 mL, 9.778 mL, 10.37 mL, 10.898 mL, and 12.347 mL, and it was confirmed that there was no contradiction between the order of the molecular weights of the samples and the order of the elution volumes thereof and that no non-specific adsorption was induced.

Example 3

A carrier γ2 was obtained in the same manner as in Example 2.

150 g of the obtained carrier γ2 was weighed onto a glass filter and thoroughly cleaned with diethylene glycol dimethyl ether.

After cleaning, the porous particle was placed in a 1 L separable flask, 150 g of diethylene glycol dimethyl ether and 150 g of polyethylene glycol #200 (manufactured by KANTO CHEMICAL CO., INC., average molecular weight of 190 to 210, log P is unclear, but the close compound tetraethylene glycol (Mw of 194) has a log P of −2.02) (1790 mol % based on glycidyl group) were placed in the separable flask, and stirring and dispersion were carried out.

After that, 1.5 mL of a boron trifluoride diethyl ether complex was added, the temperature was raised to 80° C. while stirring at 200 rpm, and the resulting mixture was subjected to the reaction for 4 hours.

The mixture was cooled, and then the reaction product was collected by filtration and washed thoroughly with water to obtain 152 g of a porous particle into which a polyol had been introduced (carrier 63).

The carrier δ3 was classified into 16 to 37 μm using a sieve to obtain 140.5 g of a packing material 3.

The alkali resistance of the obtained packing material 3 was evaluated in the same manner as in Example 1. As a result, the amount of a carboxy group produced was 16.1 μmol/mL, and it was confirmed that the packing material 3 had excellent alkali resistance.

Further, the non-specific adsorption of the obtained packing material 3 was evaluated in the same manner as in Example 1. As a result, the elution volumes of the samples were 8.517 mL, 9.241 mL, 9.47 mL, 10.034 mL, 10.484 mL, and 11.927 mL, and it was confirmed that there was no contradiction between the order of the molecular weights of the samples and the order of the elution volumes thereof and that no non-specific adsorption was induced.

Example 4

A packing material 4 was obtained in the same manner as in Example 3 except that 33.2 g of glycidyl methacrylate (trade name: Blemmer G (registered trademark) manufactured by NOF Corporation), 5.9 g of glycerin-1,3-dimethacrylate (trade name: NK Ester 701, SHIN-NAKAMURA CHEMICAL Co., Ltd.), 58.7 g of diethyl succinate, and 1.9 g of 2,2'-azobis(2,4-dimethylvaleronitrile) were used to provide an oil phase. The amount of glycidyl methacrylate used was 90.0 mol % based on the total amount of the monomers, and the amount of glycerin-1,3-dimethacrylate used was 10.0 mol % based on the total amount of the monomers.

The alkali resistance of the obtained packing material 4 was evaluated in the same manner as in Example 1. As a result, the amount of a carboxy group produced was 11.5 µmol/mL, and it was confirmed that the packing material 4 had excellent alkali resistance.

Further, the non-specific adsorption of the obtained packing material 4 was evaluated in the same manner as in Example 1. As a result, the elution volumes of the samples were 7.52 mL, 8.214 mL, 8.451 mL, 9.062 mL, 9.511 mL, and 11.915 mL, and it was confirmed that there was no contradiction between the order of the molecular weights of the samples and the order of the elution volumes thereof and that no non-specific adsorption was induced.

Example 5

A packing material 5 was obtained in the same manner as in Example 3 except that 21.5 g of glycidyl methacrylate (trade name: Blemmer G (registered trademark) manufactured by NOF Corporation), 17.6 g of glycerin-1,3-dimethacrylate (trade name: NK Ester 701, SHIN-NAKAMURA CHEMICAL Co., Ltd.), 58.7 g of diethyl succinate, and 1.9 g of 2,2'-azobis(2,4-dimethylvaleronitrile) were used to provide an oil phase.

The amount of glycidyl methacrylate used was 66.2 mol % based on the total amount of the monomers, and the amount of glycerin-1,3-dimethacrylate used was 33.8 mol % based on the total amount of the monomers.

The alkali resistance of the obtained packing material 5 was evaluated in the same manner as in Example 1. As a result, the amount of a carboxy group produced was 18.3 µmol/mL, and it was confirmed that the packing material 5 had excellent alkali resistance.

Further, the non-specific adsorption of the obtained packing material 5 was evaluated in the same manner as in Example 1. As a result, the elution volumes of the samples were 8.692 mL, 9.434 mL, 9.625 mL, 10.236 mL, 10.759 mL, and 12.457 mL, and it was confirmed that there was no contradiction between the order of the molecular weights of the samples and the order of the elution volumes thereof and that no non-specific adsorption was induced.

Example 6

A packing material 6 was obtained in the same manner as in Example 3 except that 33.2 g of glycidyl methacrylate (trade name: Blemmer G (registered trademark) manufactured by NOF Corporation), 5.9 g of ethylene glycol dimethacrylate (trade name: NK Ester 1G, SHIN-NAKAMURA CHEMICAL Co., Ltd.), 29.3 g of butyl acetate, 29.3 g of chlorobenzene, and 1.9 g of 2,2'-azobis(2,4-dimethylvaleronitrile) were used to provide an oil phase. The amount of glycidyl methacrylate used was 88.7 mol % based on the total amount of the monomers, and the amount of ethylene glycol dimethacrylate used was 11.3 mol % based on the total amount of the monomers.

The alkali resistance of the obtained packing material 6 was evaluated in the same manner as in Example 1. As a result, the amount of a carboxy group produced was 12.5 µmol/mL, and it was confirmed that the packing material 6 had excellent alkali resistance.

Further, the non-specific adsorption of the obtained packing material 6 was evaluated in the same manner as in Example 1. As a result, the elution volumes of the samples were 9.613 mL, 10.427 mL, 10.444 mL, 11.066 mL, 11.582 mL, and 12.575 mL, and it was confirmed that there was no contradiction between the order of the molecular weights of the samples and the order of the elution volumes thereof and that no non-specific adsorption was induced.

Comparative Example 1

The porous particle (carrier a1) obtained in the same manner as in Example 1 was subjected to the step D of Example 1.
<Step (D): Introduction Reaction of Polyol>

98 g of carrier a1, 600 mL of water, and 1000 g (3050 mol % based on glycidyl group) of D-sorbitol (manufactured by KANTO CHEMICAL CO., INC.) were placed in a 3 L separable flask and stirred to form a dispersion.

After that, 10 g of potassium hydroxide was added, the temperature was raised to 60° C. while stirring at 200 rpm, and the resulting mixture was subjected to the reaction for 15 hours.

The mixture was cooled, and then the reaction product was collected by filtration and washed thoroughly with water to obtain 130 g of a porous particle into which a polyol had been introduced (carrier δ7).

The carrier δ7 was classified into 16 to 37 µm using a sieve to obtain 115 g of a packing material 7.

The alkali resistance of the obtained packing material 7 was evaluated in the same manner as in Example 1. As a result, the amount of a carboxy group produced in the packing material 7 was 120.3 µmol/mL, resulting in poor alkali resistance.

Further, the non-specific adsorption of the obtained packing material 7 was evaluated in the same manner as in Example 1. As a result, the elution volumes of the samples were 8.606 mL, 9.769 mL, 9.9567 mL, 10.703 mL, 11.470 mL, and 12.112 mL, and it was confirmed that there was no contradiction between the order of the molecular weights of the samples and the order of the elution volumes thereof and that no non-specific adsorption was induced.

Comparative Example 2

A packing material 8 was obtained in the same manner as in Example 1 except that 150 g of ethylene glycol was used instead of 1,4-butanediol as an alkylene group-introducing agent.

The alkali resistance of the obtained packing material 8 was evaluated in the same manner as in Example 1. As a result, the amount of a carboxy group produced in the packing material 8 was 108.4 µmol/mL, resulting in poor alkali resistance.

Further, the non-specific adsorption of the obtained packing material 8 was evaluated in the same manner as in Example 1. As a result, the elution volumes of the samples were 9.708 mL, 9.8946 mL, 10.6452 mL, 11.5374 mL, and 12.1656 mL, and it was confirmed that there was no contradiction between the order of the molecular weights of the samples and the order of the elution volumes thereof and that no non-specific adsorption was induced.

Comparative Example 3

A packing material 9 was obtained in the same manner as in Example 2 except that no glycidyl group was introduced and no polyol was introduced. That is, the carrier $2 obtained in the step (B) of Example 2 was used as the packing material 9.

The non-specific adsorption of the obtained packing material 9 was evaluated in the same manner as in Example 1. As a result, the elution volumes of the samples were 8.590 mL, 10.316 mL, 9.603 mL, 10.484 mL, 13.863 mL, and 12.861 mL, and it was confirmed that there was a contradiction between the order of the molecular weights of the samples and the order of the elution volumes thereof and that non-specific adsorption was induced. Because of this, the alkali resistance was not evaluated.

Comparative Example 4

A packing material 10 was obtained in the same manner as in Example 1 except that 150 g (480 mol % based on glycidyl methacrylate) of 1,10-decanediol was used instead of 1,4-butanediol as an alkylene group-introducing agent.

The non-specific adsorption of the obtained packing material 10 was evaluated in the same manner as in Example 1. As a result, the elution volumes of the samples were 9.991 mL, 10.15 mL, 10.063 mL, 10.691 mL, 12.172 mL, and 11.531 mL, and it was confirmed that there was a contradiction between the order of the molecular weights of the samples and the order of the elution volumes thereof and that non-specific adsorption was induced. Because of this, the alkali resistance was not evaluated.

Comparative Example 5

A packing material 11 was obtained in the same manner as in Example 3 except that 13.7 g of glycidyl methacrylate (trade name: Blemmer G (registered trademark) manufactured by NOF Corporation), 25.4 g of glycerin-1,3-dimethacrylate (trade name: NK Ester 701, SHIN-NAKAMURA CHEMICAL Co., Ltd.), 58.7 g of diethyl succinate, and 1.9 g of 2,2'-azobis(2,4-dimethylvaleronitrile) were used to provide an oil phase. The amount of glycidyl methacrylate used was 46.4 mol % based on the total amount of the monomers, and the amount of glycerin-1,3-dimethacrylate used was 53.6 mol % based on the total amount of the monomers.

The non-specific adsorption of the obtained packing material 11 was evaluated in the same manner as in Example 1. As a result, the elution volumes of the samples were 8.872 mL, 10.131 mL, 9.82 mL, 10.422 mL, 12.782 mL, and 12.553 mL, and it was confirmed that there was a contradiction between the order of the molecular weights of the samples and the order of the elution volumes thereof and that non-specific adsorption was induced. Because of this, the alkali resistance was not evaluated.

It was confirmed that the exclusion limit molecular weights of the packing materials obtained in Examples 1 to 6 and Comparative Examples 1 to 5 were all 1,000,000 or more.

Comparative Example 6

A packing material 12 was obtained in the same manner as in Example 3 except that 37.1 g of glycidyl methacrylate (trade name: Blemmer G (registered trademark) manufactured by NOF Corporation), 2.0 g of glycerin-1,3-dimethacrylate (trade name: NK Ester 701, SHIN-NAKAMURA CHEMICAL Co., Ltd.), 58.7 g of diethyl succinate, and 1.9 g of 2,2'-azobis(2,4-dimethylvaleronitrile) were used to provide an oil phase. The amount of glycidyl methacrylate used was 96.7 mol % based on the total amount of the monomers, and the amount of glycerin-1,3-dimethacrylate used was 3.3 mol % based on the total amount of the monomers.

Packing into a stainless steel column using the obtained packing material 12 was attempted. However, the back pressure was high, making liquid feeding difficult, and this made it impossible to carry out the packing. Because of this, neither of the evaluations was able to be carried out.

Results of the above Examples and Comparative Examples are shown in Table 1.

From the above results, by adopting the configuration of the present invention, a packing material having suppressed non-specific adsorption and high alkali resistance can be obtained.

When no hydrophobic portion is provided or when the alkylene chain is short, the alkali resistance is low as shown in Comparative Examples 1 and 2. In addition, it was found that when the alkylene chain is too long or when no hydrophilic portion is provided, the hydrophobicity is strong, and non-specific adsorption is induced as shown in Comparative Examples 3 and 4. In addition, in Comparative Example 5 having many repeating units derived from a polyfunctional monomer, it was found that non-specific adsorption was induced, and in Comparative Example 6 having fewer repeating units derived from a polyfunctional monomer, it was found that the back pressure applied to the apparatus was high, making column packing difficult.

TABLE 1

|  | Polyfunctional Monomer | Degree of crosslinking [mol %] | Alkylene group | Polyol | Non-specific adsorption[5] | Amount of carboxy group produced [μmol/mL] |
| --- | --- | --- | --- | --- | --- | --- |
| Ex. 1 | GDMA[1] | 20.2 | Butylene group | Sorbitol | ◯ | 21 |
| Ex. 2 | GDMA | 20.2 | Cyclohexane-1,4-dimethylene group | EG[3] | ◯ | 15.2 |
| Ex. 3 | GDMA | 20.2 | Cyclohexane-1,4-dimethylene group | PEG200[4] | ◯ | 16.1 |
| Ex. 4 | GDMA | 10 | Cyclohexane-1,4-dimethylene group | PEG200 | ◯ | 11.5 |
| Ex. 5 | GDMA | 33.8 | Cyclohexane-1,4-dimethylene group | PEG200 | ◯ | 18.3 |
| Ex. 6 | EDMA[2] | 11.3 | Cyclohexane-1,4-dimethylene group | PEG200 | ◯ | 12.5 |

TABLE 1-continued

| | Polyfunctional Monomer | Degree of crosslinking [mol %] | Alkylene group | Polyol | Non-specific adsorption[5] | Amount of carboxy group produced [μmol/mL] |
|---|---|---|---|---|---|---|
| Comp. Ex. 1 | GDMA | 20.2 | — | Sorbitol | ○ | 120.3 |
| Comp. Ex. 2 | GDMA | 20.2 | Ethylene group | EG | ○ | 108.4 |
| Comp. Ex. 3 | GDMA | 20.2 | Cyclohexane-1,4-dimethylene group | — | X | — |
| Comp. Ex. 4 | GDMA | 20.2 | Decanylene group | Sorbitol | X | — |
| Comp. Ex. 5 | GDMA | 53.6 | Cyclohexane-1,4-dimethylene group | PEG200 | X | — |
| Comp. Ex. 6 | GDMA | 3.3 | Cyclohexane-1,4-dimethylene group | PEG200 | Unmeasurable | |

[1] GDMA: Glycerin-1,3-dimethacrylate
[2] EDMA: Ethylene glycol dimethacrylate
[3] EG: Ethylene glycol
[4] PEG200: Polyethylene glycol #200
[5] ○: No non-specific adsorption, X: Non-specific adsorption

The invention claimed is:

1. A packing material, comprising
a porous organic polymer carrier comprising 60 to 95 mol % of a repeating unit derived from glycidyl methacrylate and 5 to 40 mol % of a repeating unit derived from a polyfunctional monomer,
wherein one end of at least one alkylene group selected from the group consisting of a linear alkylene group, a cycloalkylene group, and a linear alkylcycloalkylene group, having 4 to 9 carbon atoms, is bonded to the porous organic polymer by a glycidyl group derived from glycidyl methacrylate, and
an other end of the alkylene group is bonded to any one end of a polyol via an ether bond.

2. The packing material according to claim 1, wherein the polyfunctional monomer is a (meth)acryloyl-based monomer comprising two or more (meth)acryloyl groups.

3. The packing material according to claim 2, wherein the polyfunctional monomer comprises at least one selected from the group consisting of ethylene glycol dimethacrylate and glycerin-1,3-dimethacrylate.

4. The packing material according to claim 1, wherein the alkylene group comprises either butylene or cyclohexane-1,4-dimethylene.

5. The packing material according to claim 1, wherein the polyol is bonded via an ether bond derived from a glycidyl group ring-opened by the polyol.

6. The packing material according to claim 1, wherein the polyol comprises any of ethylene glycol, polyethylene glycol, and sorbitol.

7. The packing material according to claim 1, wherein the packing material is for size exclusion chromatography.

8. A method for producing the packing material according to claim 1, the method comprising the following steps (A) to (D):
a step (A) of polymerizing a raw material monomer comprising glycidyl methacrylate and a polyfunctional monomer in the presence of a diluent and a polymerization initiator to obtain a carrier α, which is a porous organic polymer carrier,
a step (B) of reacting a glycidyl group derived from glycidyl methacrylate of the carrier α with one hydroxyl group of a diol compound comprising a linear or aliphatic ring-containing alkylene group having 4 to 9 carbon atoms in a structure thereof to obtain a carrier β to which an end of the diol compound comprising the alkylene group in the structure thereof is bonded;
a step (C) of reacting an other hydroxyl group of the diol compound comprising the alkylene group in the structure thereof bonded to the carrier β with epichlorohydrin to obtain a carrier γ in which a glycidyl group is introduced into the carrier β; and
a step (D) of reacting the glycidyl group of the carrier γ with a hydroxyl group of a polyol in the presence of water to obtain a carrier δ to which any one end of the polyol is bonded as an ether bond.

9. A column for size exclusion chromatography, comprising a housing for liquid chromatography and the packing material according to claim 7 packed into the housing for liquid chromatography.

* * * * *